United States Patent Office 3,066,150
Patented Nov. 27, 1962

3,066,150
CONVERSION OF INVERT MOLASSES
Robert E. Jones, Rahway, and Henry B. Lange, Scotch Plains, N.J., assignors to Merck & Co., Inc., Rahway, N.J., a corporation of New Jersey
No Drawing. Filed Jan. 2, 1958, Ser. No. 706,594
2 Claims. (Cl. 260—347.8)

This invention relates to the conversion of sugar to 5-hydroxymethyl furfural (HMF), and has for its object the provision of an improved process for the treatment of invert molasses to separate the ionic material from the sugar, and the conversion of the resulting product containing higher purity sugar into HMF.

In the conversion of sugars in aqueous solution at elevated temperatures and acid catalyst is necessary to achieve an efficient yield in a relatively short time. Although invert molasses provides a supply of inexpensive sugar in aqueous solution, we have found it to be impractical to convert the sugar to HMF because of the contained cations and organic acids. The molasses contains various inorganic compounds including calcium salts, and such organic acids as succinic, aconitic and malic, which are ionic materials. The yield of HMF in converting the sugar of molasses to HMF according to the process of the copending application of John D. Garber and Robert E. Jones Serial No. 624,224, filed November 26, 1956, is generally satisfactory, but the organic acids appear to react with the HMF and form products which seriously impair its purity. Moreover, the cations, such as calcium and sodium, react with the acid catalyst forming an intractable solid or sludge which not only destroys the catalyst but plugs the reactor. When sulfuric acid or a sulfate such as aluminum sulfate is used as the catalyst this solid is probably calcium sulfate.

This invention is based on our discovery of a very simple and efficient process for the removal from the molasses of the cations and organic acids forming a purified invert molasses from which we can form HMF in high purity from this inexpensive source of sugar. In accordance with our invention we pass the molasses through a bed or column of a cation exchange resin, and by the ion exclusion technique separate in aqueous solution the ionic cations and organic acids from the solution of nonionic sugar. By selecting a resin having the proper particle size, and porosity as represented by its crosslinking, the aforementioned solutions can be separated from molasses by fractionation. The resin sold by the Dow Chemical Company under the name Dowex 50 (X-2), which is a phenolic methylene sulfonic acid type resin copolymerized with divinylbenzene has the crosslinkage and porosity to effect a separation of the ionic material from the sugar by ion exclusion. In the above trademark, the X represents the percent of divinyl-benzene in the copolymer and it is a mere detail to select the resin which is most efficient for the ion exclusion treatment of invert molasses. The ion exclusion technique is important in our process for the following reasons:

(1) No chemicals are consumed on regeneration of the resin—only water (and power for pumping) are consumed;
(2) A fair degree of decolorization occurs on the ion exclusion column; and
(3) The salts of the organic acids (many worth recovering in heavy production) come out in definite cuts and can be stored for other uses.

With each resin having a certain average particle size and porosity there are volume relationships that are important in the ion exclusion process. These are the volume within the resin itself, and the interstitial volume which is the space between the particles of resin. When the molasses is passed through the resin the ionic material appears as soon as the influent volume equals the interstitial volume and soon reaches its initial concentration. The nonionic sugar solution does not appear until the influent volume reaches the sum of the two volumes and soon reaches its peak concentration. The invention is accordingly practiced by separating the first fraction containing the ionics which is low in sugar from the last fraction which is low in ionics and high in sugar.

In carrying out an operation of the invention a molasses containing about 75% sugar is preferably diluted with water to about 57 to 58% sugar to provide a solution which will flow freely through the column of ion exchange resin. Into a column, for example 2.8 cm. in diameter, was slurried 298 cc. of Dowex 50 (X-2), using a standard sodium chloride solution for mobilizing, giving a resin bed 49 cm. deep. Salt washing was continued until the effluent showed neutral pH—at this point the column was "on the sodium cycle." The column was next washed with water until the chloride ion was displaced. In this treatment the resin swells about 50% and this part of the operation may be done in a separate batch or container.

The sugar solution for the operation was made from 51 grams of molasses containing 38.2 grams of sugar which was diluted with 15 cc. of water. Three separate runs of this solution were passed through the column. Then the operation was started by passing the solution at the rate of 4.1 cc./min. through the column. The cuts and their compositions thereof are described in the following table:

*Table I*

| No. | Volume cc. | Specific Gravity | Wt. Sugars, g. | Na Test | Remarks |
|---|---|---|---|---|---|
| a | 175 | | | | Clear forerun. |
| 1 | 50 | 0.999–1.000 | | | Yellow sol'n. |
| 2 | 25 | 1.001–1.002 | | | Brown-yellow sol'n. |
| 3 | 25 | 1.003 | | | Dark brown sol'n. |
| 4 | 25 | 1.006 | | | Do. |
| 5 | 25 | 1.010 | 0.75 | Moderate | Do. |
| 6 | 25 | 1.019 | 1.38 | do | Do. |
| 7 | 25 | 1.030 | 2.10 | do | Do. |
| 8 | 25 | 1.038 | 2.59 | do | Brown-yellow sol'n. |
| 9 | 25 | 1.050 | 3.33 | Weak | Yellow sol'n. |
| 10 | 25 | 1.069 | 4.60 | do | Do. |
| 11 | 25 | 1.085 | 5.67 | do | Do. |
| 12 | 25 | 0.091 | 6.05 | Neg | Do. |
| 13 | 25 | 1.088 | 5.85 | Neg | Do. |
| 14 | 25 | 1.068 | 4.53 | Neg | Do. |
| 15 | 25 | 1.039 | 2.65 | Neg | Do. |
| 16 | 25 | 1.014 | 1.00 | Neg | Do. |
| 17 | 25 | 1.005 | | Neg | Do. |
| b | 200 | | | Neg | Clear column wash. |
| Total | | | 40.50 g. (106%) | | |

The differences in the sugar balance (6%) is probably due to the temperature differences in specific gravity measurements made on the solutions.

The cuts were obtained by collecting the samples in series one after another until the entire mass of solution was passed through the column. The differences in the composition from cut to cut are due to some concurrent passage of ionic and nonionic materials. In practice, the first part of the run, say, consisting of the collected material of cuts 1–8, is discarded, or saved for recovery of the contained chemicals, as containing most of the ionics and an unimportant amount of sugar. The combined material of cuts 9 to 16 is collected as containing most of the sugar in a relatively pure state. The tests for sodium by the flame and zinc uranyl acetate methods of the combined cuts 9 to 16 showed the sodium content to be low and the sugar to be 88% of the total sugar.

The combined cuts 9 to 16 were used as a product for coversion to HMF by the process described and claimed in the said application of John D. Garber and Robert E. Jones. This application describes a continuous process for the conversion of sugar in aqueous solution to HMF at temperatures of from 250° to 380° C. with an acid catalyst, and the separation of the HMF as quickly as possible to minimize its decomposition. The process is carried out advantageously by passing the sugar solution rapidly through heated tubes and the separation of the HMF in a suitable solvent.

For the conversion of the sugar of the purified molasses to HMF, aluminum sulfate was added to the sugar solution as catalyst, and the solution containing 15.8% sugar was treated in sealed capillary tubes for conversion of the sugar to HMF. The tubes of the type which are used for melting point determinations are especially suitable for such tests. These tubes were filled with from 40–60 mg. of the solution the ends of which were sealed by fusion. The sealed tubes were heated in an oil bath held at a constant temperature of about 270° C. for the desired time which was about 8 to 13 seconds. The tubes were quickly removed from the oil and plunged into a cold oil bath. Then the tubes were smashed in volumetric flasks. The conversion to HMF was estimated by determining U.V. absorption at 2830° A.

The results of the conversions in six capillary tubes, run at various contact times, and the HMF yields, are listed in the following table.

| Run | Time, sec. | Percent HMF | "Ratio" |
|---|---|---|---|
| 1 | 10 | 47.2 | 3.30 |
| 2 | 12 | 42.7 | |
| 3 | 13 | 38.7 | |
| 4 | 11 | 46.4 | 3.38 |
| 5 | 8 | 42.6 | |
| 6 | 12 | 47.2 | 3.00 |

The HMF yield on this material is nearly standard in that the highest yield thus far obtainable using crystalline sucrose is 52%. Two points are worthy of note: (1) the purity is slightly below standard, as judged by the "ratio," and (2) the contact time for maximum yield is slightly longer than with 25% sucrose solutions.

The "ratio" used to judge purity of crude HMF in solution is optical density at 2830 m$\mu$ divided by optical density at 2290 m$\mu$. For pure HMF, the "ratio" is 5.7–5.9.

The invert molasses contains buffer salts which cancel the effect of the acid catalyst for conversion of the sugar to HMF by heating aqueous solutions thereof to temperatures of from 250° C. to 280° C. as aforementioned. The removal of the buffer salts permits the HMF formation catalysts to operate.

We claim:
1. The process for the conversion of the sugar of invert molasses to 5-hydroxymethyl furfural which comprises passing the molasses solution through a bed of granular cation exchange resin of the phenolic cross-linked sulfonic acid type on the sodium cycle to separate from the molasses solution by ion exclusion a solution containing the ionic cations and organic acids and a solution containing the major portion of the sugar which is relatively free of such cations and organic acids, and heating the solution of sugar to a temperature above 250° C. in the presence of an acid catalyst to form the 5-hydroxymethyl furfural.

2. In the process of claim 1, heating the sugar solution to a temperature in the range of 250° to 380° C. while passing the solution continuously through a tube, and then rapidly cooling the solution and separating the 5-hydroxymethyl furfural.

References Cited in the file of this patent

UNITED STATES PATENTS 2,750,394    Peniston _____ June 12, 1956

FOREIGN PATENTS 591,858    Great Britain _____ Sept. 1, 1947
600,871    Great Britain _____ Apr. 21, 1948